April 14, 1970  D. H. PHILLIPS  3,505,896
HYDROSTATIC TRACTOR CONTROL APPARATUS
Original Filed July 17, 1967  3 Sheets-Sheet 1
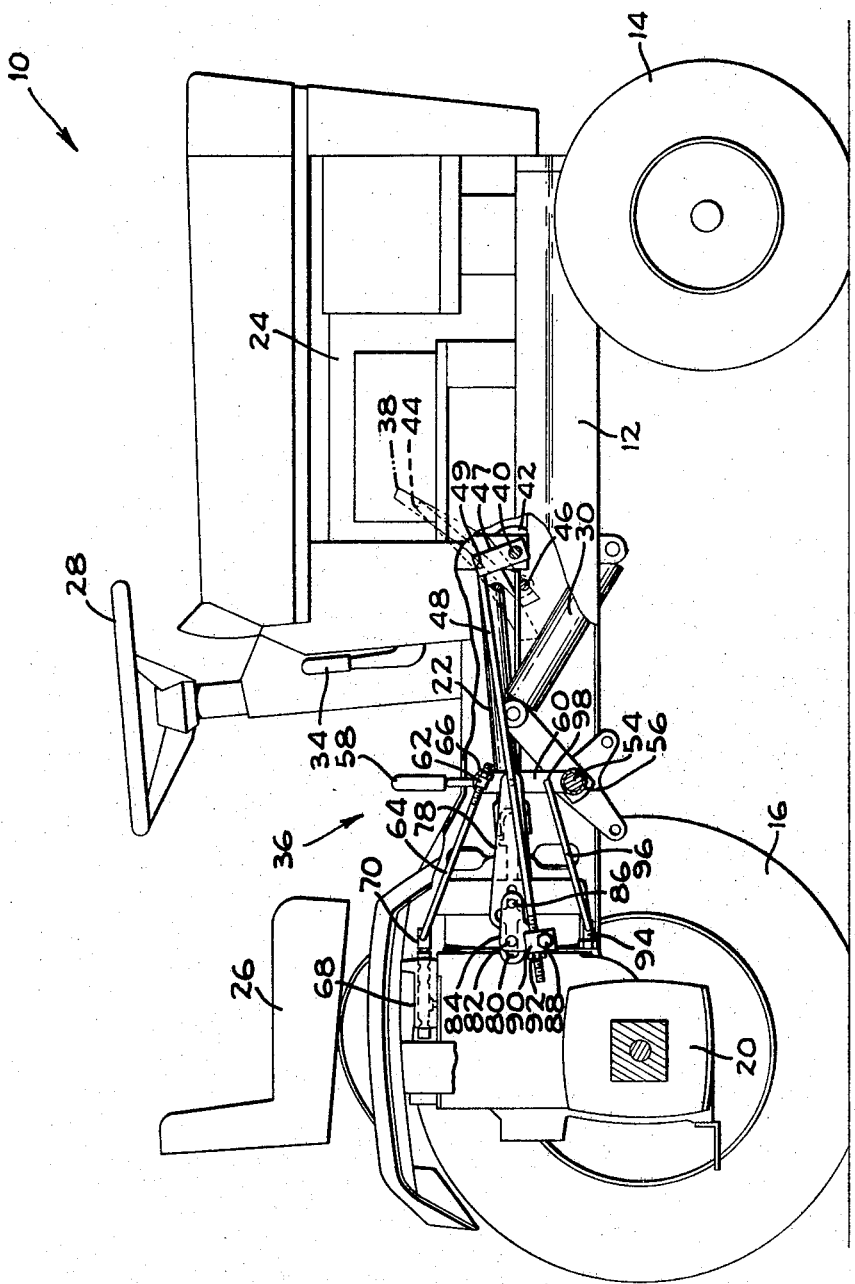
INVENTOR.
DAVID H. PHILLIPS
BY Francis W. Anderson
ATTORNEY April 14, 1970 D. H. PHILLIPS 3,505,896
HYDROSTATIC TRACTOR CONTROL APPARATUS
Original Filed July 17, 1967 3 Sheets-Sheet 2
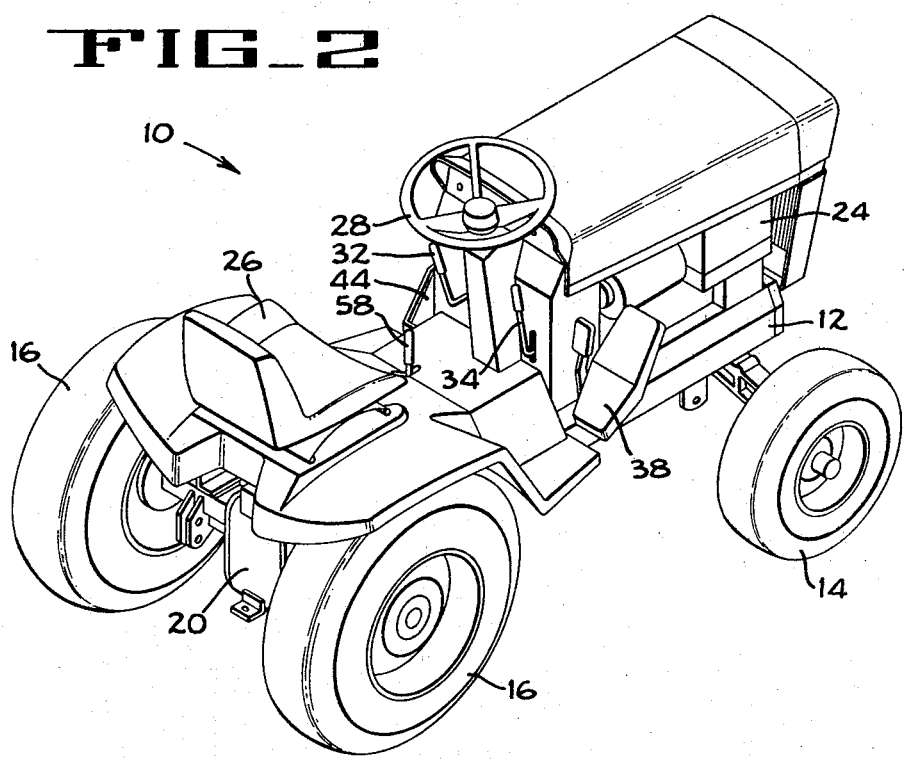
FIG_2
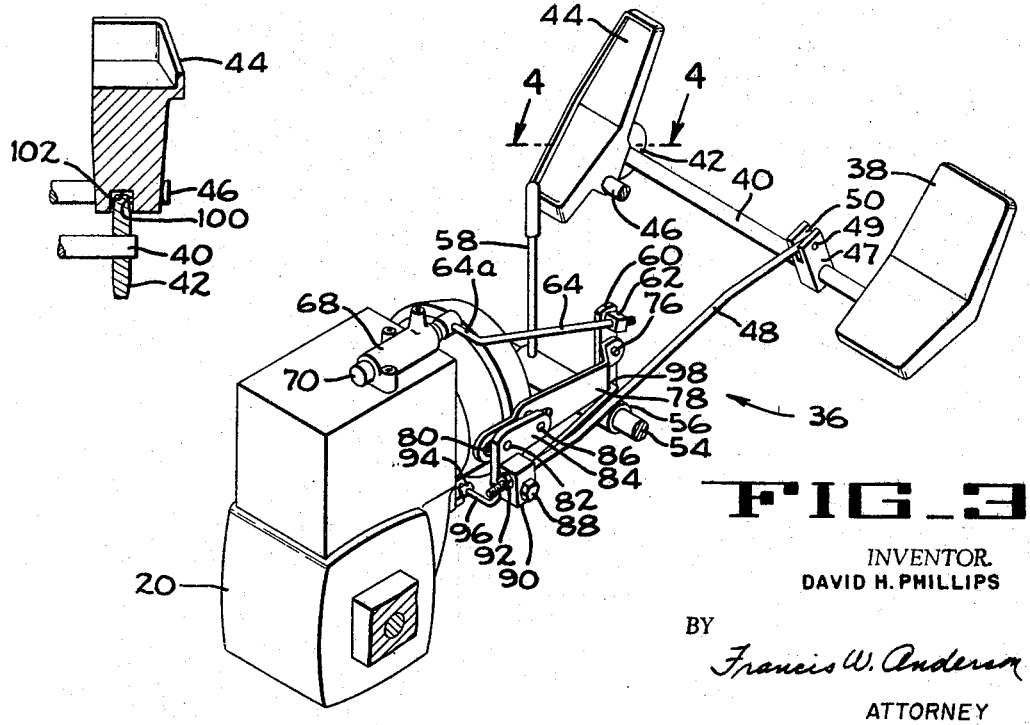
FIG_4
FIG_3
INVENTOR.
DAVID H. PHILLIPS
BY
Francis W. Anderson
ATTORNEY

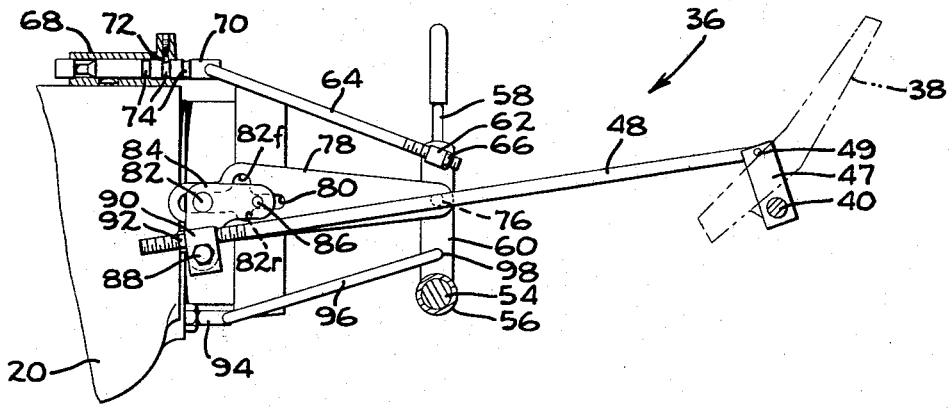
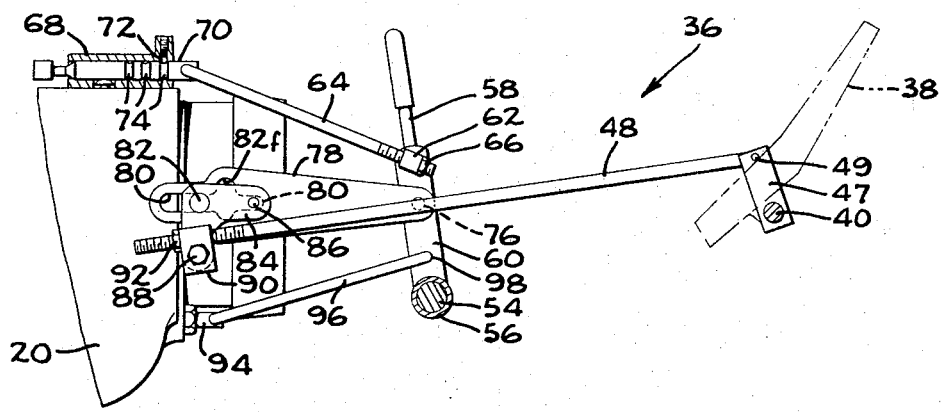
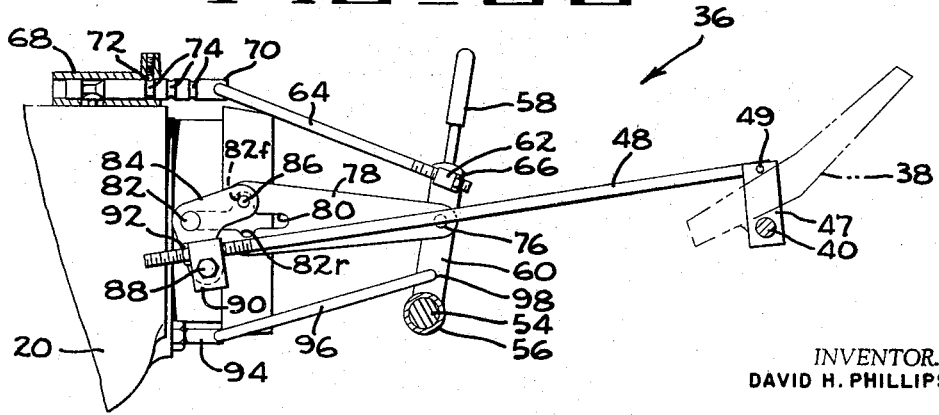

United States Patent Office 3,505,896
Patented Apr. 14, 1970

3,505,896
HYDROSTATIC TRACTOR CONTROL APPARATUS
David H. Phillips, Port Washington, Wis., assignor to FMC Corporation, San Jose, Calif., a corporation of Delaware
Continuation of application Ser. No. 653,981, July 17, 1967. This application Mar. 6, 1969, Ser. No. 806,039
Int. Cl. G05g 11/00
U.S. Cl. 74—481          6 Claims

ABSTRACT OF THE DISCLOSURE

The speed and direction of a tractor, having a hydrostatic transmission coupled to a suitable internal combustion engine, is controlled by linkages connected to a foot operated pedal. A hand operated transmission lever is connected to the linkages. This lever may be positioned in a "park," "neutral" or "drive" position. In drive, forward movement of the tractor takes place when the pedal is rotated in the clockwise direction and the speed achieved is proportional to the degree of pedal rotation. For rearward movement the pedal is rotated in the counterclockwise direction with the speed in such direction also being proportional to the amount of pedal rotation.

---

This application is a continuation of U. S. application Ser. No. 653,981, filed July 17, 1967, now abandoned.

When the transmission lever is put in neutral position the linkages are arranged to prevent rotation of the pedal. The same is true of the park position but in addition a parking pawl is actuated locking the gear train of the hydrostatic transmission.

BACKGROUND OF THE INVENTION

Field of invention

This invention relates to a control system for a vehicle employing a hydrostatic transmission.

Description of prior art

The advantages of producing a vehicle propulsion arrangement whereby the transition from forward to reverse can be accomplished by a single control are known in the prior art. Typical systems of this nature are disclosed in U.S. Patents 2,774,436, 2,904,957 and 3,250,340. Of the more important operational benefits derived from such arrangements, particularly its adaptation to vehicles that perform material handling functions and/or agricultural duties such as rototilling, grass cutting, etc., is that of giving the operator more freedom to deal with the controls, whether they be hydraulic or electrical, for operating the various working appliances.

Some of the prior art disclosures coordinate the speed and direction control with the prime mover which is usually an internal combustion engine. Thus, by operating one pedal the speed of the prime mover is regulated while operation of the other pedal determines the output of the hydrostatic transmission.

SUMMARY OF THE INVENTION

In accordance with the present invention the pedal controlling the direction and the speed of the vehicle is mounted on a shaft extending transverse to the longitudinal axis of the vehicle. On the other end of the shaft a circular metal disc is mounted. Another pedal actuated by the other foot of the operator is provided for engaging the disc and consequently holding the shaft in any selective position. This arrangement provides the advantage of maintaining a constant speed without requiring the operator to hold his foot on the speed and direction control pedal.

Further in accordance with this invention the linkage arrangement is designed to fulfill the novel function of preventing actuation of the speed control pedal when the transmission lever is located in the neutral or park position. Such an arrangement reliably prevents inadvertent movement of the vehicle.

BRIEF DESCRIPTION OF THE DRAWINGS

FIGURE 1 is a side elevation partly in section of a tractor embodying apparatus constructed in accordance with the principle of this invention, FIGURE 2 is a perspective of a vehicle shown in FIGURE 1, but on reduced scale, further illustrating the structure of FIGURE 1.

FIGURE 3 is a perspective, on a slightly larger scale than FIGURE 2, illustrating the linkage system for controlling the hydrostatic transmission, FIGURE 4 is a section taken substantially along the line 4—4 of FIGURE 3, FIGURES 5A, 5B and 5C illustrate, respectively, the position assumed by the linkage mechanism when the lever is in neutral position, in park position, and in drive position.

IN FIGURE 1 a tractor incorporating the novel structure of this invention is generally indicated by the numeral 10 and it will be observed that it is provided with a frame structure 12 rotatably supporting forward steerable wheels 14 and rearward driving wheels 16. At the rear end of the frame structure a hydrostatic transmission or transaxle 20 is mounted to the frame and it is connected to a drive shaft 22 that is connected to the output of a suitable internal combustion engine 24. As usual the vehicle is provided with a seat 26 and a steering wheel 28 associated with conventional mechanisms and linkages for turning the wheels 14.

Also carried by the frame 12 is a hydraulic lift cylinder 30 which can be extended or retracted by a valve operated by a lever 32 (FIG. 2). The tractor is also equipped with a power take-off unit whose typical use is to operate a lawn mower or snow blower. The power take-off is put in operation by another lever 34.

The novel hydrostatic transmission control linkages of this invention are generally indicated by the numeral 36. It includes a speed control pedal 38 rigidly connected to a transverse shaft 40 supported in any suitable manner on the vehicle frame structure 12. The pedal 38 is operated by the right foot of the driver. On the other end of the shaft 40 a circular disc 42 is secured which is engageable by a constant speed hold pedal 44 in a manner and for a purpose hereinafter made clear. The pedal 44 is attached to a separate shaft 46 (FIG. 1) mounted on the frame of the vehicle. On the shaft 40 a block 47 is keyed thereto and is pivotally connected by a pin 49 to a control rod 48 that is received within a slot 50 formed in the end of the block. Also carried by the frame 12 and located longitudinally rearwardly of the shaft 40 is a cross shaft 54 having fitted thereover an elongate sleeve 56 which is free to rotate relative to the shaft 54. Rotation of the sleeve 56 is accomplished by a transmission lever 58 located within easy reach of the operator. Also secured to the sleeve 56 is an upwardly extending lever 60 having pivotally connected thereto various operating linkages for controlling the hydrostatic transmission 20.

Pivotally connected at the upper portion of the lever 60 is a small block 62 through which is threadedly disposed an oil relief spool link 64. A lock nut 66 is provided on the threaded portion of the link 64 to adjust its effective length. On the upper surface of the transmission housing an oil relief valve 68 is provided and it includes a spool 70 and a spring biased ball detent 72 cooperating with longitudinally spaced grooves 74 which locate the spool of the valve to condition the circuit in the hydrostatic transmission for the neutral, park and drive positions. As shown in FIGURE 3 the oil relief spool link 64 has a bent portion 64a which is loosely received in a hole formed in the outwardly projecting portion of the spool 70.

At an intermediate portion of the lever 60 there is pivotally connected, by means of a pin 76, a latch bracket 78. This bracket is provided with an elongated slot 80 through which extends a short stub shaft 82. The shaft 82 controls the displacement of a radial piston pump which is part of the hydrostatic transmission which per se does not form part of this invention. Rotation of the shaft 82 in a clockwise or counterclockwise direction, causes rotation of a cam ring which, in turn, regulates the output of a hydraulic pump that is part of the hydrostatic transmission. The slot 80 is provided with opposed transverse slots 82f and 82r, the purpose for which will be presently explained.

Rigidly connected to the stub shaft 82 and lying adjacent the bracket 78 is a bell crank 84 mounting a pin 86 extending within the slot 80. Pivotally connected to the downwardly extending arm of the bell crank 84, by means of a suitable bolt 88, is a pivot block 90 which is also threadedly connected to the control rod 48. A jam nut 92 is provided for adjusting the effective length of the control rod 48.

As mentioned, FIGURES 5A, 5B and 5C show the hydrostatic transmission control linkages 36 in the neutral position, park position and drive position respectively. While in neutral it will be observed that the pin 86 is in that portion of the slot 80 (to the right of the transverse slots 82f and 82r) which prevents rotation of the bell crank 84 and, consequently, the stub shaft 82. Accordingly, the speed control pedal 38 cannot be actuated by the operator. When the transmission lever 58 is in the park position the latch bracket 78 is moved slightly to the left or rearwardly of the vehicle which, as shown in FIGURE 5B, still maintains the pin 86 in that portion of the slot 80 that prevents rotation of the bell crank 84. The drive position is achieved by moving a transmission lever 58 clockwise about the cross shaft 54. As is apparent the latch bracket 78 is moved forwardly, or to the right as viewed in FIGURE 5C, locating the transverse slots 82f and 82r in the arc of rotation of the pin 86. This allows rotation of the bell crank 84 and the shaft 82 when the pedal 38 is actuated by the operator.

Should it be desired to travel in a forward direction the operator rotates the pedal 38 in a clockwise direction which, by virtue of the control rod 48, rotates the bell crank 84 in a counterclockwise direction. Since the pin 86 can enter the transverse slot 82f, rotation of the stub shaft 82 is effected conditioning the hydrostatic transmission to impart torque to the driving wheel 16 of the vehicle. The extent to which the shaft 82 is rotated by the bell crank 84 determines the speed that can be assumed by the vehicle and this speed is limited by the design parameters of the hydrostatic transmission. Accordingly, the length of the transverse slot 82f is consistent wtih the maximum design speed of the vehicle. When it is desired to run the vehicle in reverse the speed control pedal 38 is rotated in a counterclockwise direction, thus rotating the bell crank 84 in a clockwise direction thereby allowing the pin 86 to enter the transverse slot 82r. The length of this transverse slot is also designed to limit the rearward speed of the vehicle as dictated by the design of the hydrostatic transmission.

The hydrostatic transmission particularly adapted for the illustrated tractor is made by the Eaton Marshall Division of Eaton, Yale & Towne located at Marshall, Mich. and it is identified as the Marshallmatic hydrostatic transmission.

In addition to the operation of the oil relief valve 68 and the latch bracket 78 the transmission lever 58 is also connected to a parking pawl 94 by a link 96 pivotally connected at 98 to the lever 60. When the transmission lever 58 is in the park position (FIG. 5B) the pawl 94 locks the gear train of the transmission preventing movement of the vehicle.

From the above description of the novel hydrostatic transmission control linkages it should be apparent that the invention provides several distinct advantages from the standpoint of operator's safety and comfort and provides flexibility to allow the operator to deal with the operation and control of the variety of attachments that can be used with this vehicle. The ability to select forward or rearward movement by use of a single control pedal leaves the operator's hands free to operate the power take-off lever 34 or the hydraulic lift lever 32. It also results in an arrangement whereby the vehicle can be stopped without the need of using service brakes. This last function is performed by merely reversing the speed control pedal 38.

The novel configuration of the latch bracket 78 in conjunction with the transmission lever 58 provides a very simple mechanism for controlling the output of the hydrostatic transmission pump which, as explained above, location of the transmission lever 58 in the neutral or park position prevents rotation of the bell crank 84 and, consequently, the stub shaft 82 which controls the displacement of the pump of the hydrostatic transmission 20.

Another feature of this invention is the provision of the constant speed hold pedal 44 which is best shown in FIGURES 3 and 4. Referring first to FIGURE 4, it will be seen that the pedal 44 is provided with a cutout portion 100 of generally U-shaped configuration. It will be recalled that the pedal 44 is fixed to a shaft 46 mounted parallel to the shaft 40 and that it is carried by the frame 12. In the orientation shown, the left foot of the operator is used to actuate the pedal 44. In rotating the pedal 44 in a clockwise direction, as viewed in FIGURE 3, the surface 102 of the cutout portion 100 engages the peripheral surface of the circular disc 42. Assuming the operator is performing a task in which long periods of constant speed are desired, all that is required to maintain this speed is to depress the pedal 44 establishing engagement of the surface 102 with the periphery of the disc 42 thus holding the shaft 40 against rotation. At this time the operator may remove his foot from the speed control pedal 38 and proceed at the desired speed. In the event the operator's foot is removed from the constant speed hold pedal 44 the shaft 40 is free to rotate allowing the linkage system 36 to assume a neutral position thereby stopping the vehicle.

What is claimed is:

1. A control apparatus for a hydrostatic transmission driven tractor, said control comprising a manually operable transmission lever having a plurality of control positions, a control shaft on said transmission for regulating the direction, speed and torque of said transmission, means for actuating said control shaft, means for enabling operation of said control shaft when said transmission lever is in one control position and for preventing operation of said control shaft when said transmission lever is in another control position, and a selectively operable foot actuated pedal means for maintaining said control shaft at a desired setting to maintain a constant output of said transmission.

2. The apparatus according to claim 1 wherein said transmission lever is adjustable respectively in a park, neutral and drive position, said enabling and preventing means includes a latch bracket having one end pivotally connected to said transmission and the other end connected to said transmission lever, an elongate longitudinal slot in the other end freely receiving said control shaft, generally opposed transverse slots extending from said elongate slot, said actuating means includes a bell crank secured to a portion of said control shaft extending laterally outwardly of said elongate slot, a pin secured to one arm of said bell crank and disposed in said elongate slot, a control link pivotally connected to the other arm of said bell crank, and a foot operated pedal for actuating said control link to thereby cause rotation of said bell crank and said control shaft when said transmission lever is in the drive position which locates said transverse slots in the path described by said pin thus resulting in movement of the tractor.

3. An engine driven tractor having a hydrostatic transmission which is controllable to infinitely vary the speed of the tractor in a forward and reverse direction, said transmission connected to a control mechanism comprising a rocking control shaft extending from the housing of said transmission with the degree and the direction of rotation of said control shaft determining the speed and direction of the tractor, control shaft rocking means, selectively operable means for actuating the rocking means to effect rotation of said control shaft, a transmission lever adjustable in a park, neutral and drive position, and a latch bracket connected to and adjusted by said transmission lever for allowing or preventing rocking of said control shaft by said selectively operable means.

4. The apparatus according to claim 3 further comprising cooperating means on said control shaft rocking means and said latch bracket for limiting the degree of rotation of said control shaft.

5. The apparatus according to claim 3 wherein said selectively operable means comprises a rocking foot pedal which effects rotation of said control shaft, and means for maintaining said foot pedal in a desired adjusted position.

6. A control for a hydrostatic transmission driven tractor comprising a manually operable linkage mechanism adjustable to a park, neutral and drive position; said transmission comprising a control shaft rotatable in opposite directions; a rockable foot operated pedal; and means operated by said foot pedal for rotating said control shaft in the mentioned directions; said foot pedal being operable, when said linkage mechanism is in the drive position, to effect rotation of said control shaft in one direction causing forward motion of the tractor, and rotation of said control shaft in the opposite direction causing rearward motion of the tractor.

References Cited

UNITED STATES PATENTS

| 2,590,888 | 4/1952 | Randol | 74—474 X |
| 3,301,086 | 1/1967 | Williams et al. | 74—480 X |
| 3,313,174 | 4/1967 | Walker et al. | 74—474 |
| 3,316,773 | 5/1967 | Findlay | 74—481 |

MILTON KAUFMAN, Primary Examiner

U.S. Cl. X.R.

180—77